United States Patent
McGill et al.

(10) Patent No.: US 9,879,753 B2
(45) Date of Patent: Jan. 30, 2018

(54) ROTARY DAMPERS, SYSTEMS, AND RELATED METHODS

(71) Applicants: LORD CORPORATION, Cary, NC (US); Brian McGill, Erie, PA (US); Keith R. Ptak, Erie, PA (US); David M. Catanzarite, Edinboro, PA (US)

(72) Inventors: Brian McGill, Erie, PA (US); Keith R. Ptak, Erie, PA (US); David M. Catanzarite, Edinboro, PA (US)

(73) Assignee: LORD Corporation, Cary, NC (US)

( * ) Notice: Subject to any disclaimer, the term of this patent is extended or adjusted under 35 U.S.C. 154(b) by 0 days.

(21) Appl. No.: 14/772,017

(22) PCT Filed: Mar. 13, 2014

(86) PCT No.: PCT/US2014/025307
§ 371 (c)(1),
(2) Date: Sep. 1, 2015

(87) PCT Pub. No.: WO2014/151257
PCT Pub. Date: Sep. 25, 2014

(65) Prior Publication Data
US 2016/0017954 A1    Jan. 21, 2016

Related U.S. Application Data

(60) Provisional application No. 61/781,091, filed on Mar. 14, 2013.

(51) Int. Cl.
*F16F 15/16* (2006.01)
*B64C 27/39* (2006.01)
(Continued)

(52) U.S. Cl.
CPC ............ *F16F 15/165* (2013.01); *B23P 15/00* (2013.01); *B64C 27/39* (2013.01); *B64C 27/51* (2013.01);
(Continued)

(58) Field of Classification Search
CPC ....... B64C 27/39; B64C 27/51; B64C 27/635; F16F 1/48; F16F 9/145; F16F 15/165;
(Continued)

(56) References Cited

U.S. PATENT DOCUMENTS 4,674,608 A * 6/1987 Morris ................... B60G 15/06
188/290
4,768,630 A * 9/1988 Aubry ..................... F16F 9/145
188/276

(Continued)

FOREIGN PATENT DOCUMENTS

EP    0478444    4/1992
FR    2592449    7/1987

*Primary Examiner* — Thomas J Williams
*Assistant Examiner* — Mariano Sy
(74) *Attorney, Agent, or Firm* — Richard G. Miller (57) ABSTRACT

Rotary dampers and systems for use and installation within a rotary winged aircraft, and related methods, are provided herein. In some aspects, a rotary damper includes a housing having a rotor assembly positioned inside the housing. The rotary damper may further include at least one resilient member disposed adjacent to an outer portion of the housing. The at least one resilient member is externally visible from outside of the rotary damper. In some aspects, the resilient member includes a torsional spring of the rotary damper. In certain aspects, the resilient member is disk shaped and slidable within a portion of the rotary damper. In some aspects, at least one primary liquid orifice is provided in a portion of the at least one rotor member. In some
(Continued)

aspects, at least one pressure equalization port is disposed within a portion of the rotor assembly.

29 Claims, 9 Drawing Sheets

(51) Int. Cl.
    *F16F 1/48*     (2006.01)
    *F16F 9/14*     (2006.01)
    *B64C 27/51*     (2006.01)
    *B64C 27/635*     (2006.01)
    *B23P 15/00*     (2006.01)
    *F16F 9/12*     (2006.01)
    *F16F 9/36*     (2006.01)

(52) U.S. Cl.
    CPC .............. *B64C 27/635* (2013.01); *F16F 1/48* (2013.01); *F16F 9/12* (2013.01); *F16F 9/145* (2013.01); *F16F 9/369* (2013.01); *B23P 2700/01* (2013.01)

(58) Field of Classification Search
    CPC ... F16F 9/12; F16F 9/369; B23P 15/00; B23P 2700/01
    USPC ..... 188/290, 296; 416/106, 107, 134 A, 140
    See application file for complete search history.

(56) References Cited

U.S. PATENT DOCUMENTS

| | | | | |
|---|---|---|---|---|
| 5,141,398 A * | 8/1992 | Bietenhader | ............ | B64C 27/51 416/107 |
| 5,266,005 A * | 11/1993 | Aubry | .................... | B64C 27/51 416/106 |
| 5,407,325 A * | 4/1995 | Aubry | .................... | B64C 27/51 416/106 |
| 6,082,507 A * | 7/2000 | Forster | .................. | B60G 13/06 188/296 |
| 7,523,817 B2 * | 4/2009 | Forster | .................... | F16F 9/145 188/296 |
| 8,167,561 B2 * | 5/2012 | Jones | ..................... | B64C 27/51 244/131 |
| 8,356,977 B2 * | 1/2013 | Jones | ..................... | B64C 27/51 188/290 |
| 8,632,308 B2 * | 1/2014 | Russell | .................. | B64C 27/35 416/145 |
| 2009/0159382 A1 * | 6/2009 | Chemouni | ............. | F16F 9/145 188/290 |

* cited by examiner

ROTARY DAMPERS, SYSTEMS, AND RELATED METHODS

CROSS REFERENCE TO RELATED APPLICATIONS

This application is National Stage of International Application No. PCT/US2014/025307, filed Mar. 13, 2014, which claims the benefit of U.S. Provisional Application No. 61/781,091, filed Mar. 14, 2013, the disclosure of which is incorporated herein by reference in its entirety.

TECHNICAL FIELD

The present subject matter relates generally to rotary dampers, systems, and related methods. More particularly the present subject matter relates to rotary dampers and systems adapted to damp lead and lag motions associated with rotary wing aircrafts, and related methods.

BACKGROUND

During operation of certain aircraft, including helicopters that incorporate articulated rotor systems, phenomena such as ground resonance may occur. Ground resonance can jeopardize the safety and operation of the aircraft, and can cause destruction thereof. In general, such phenomena occurs when the aircraft is on the ground, as rotor blades or wings become shifted out of phase with respect to one another and an imbalance of the rotor system results. As the unbalanced rotor system begins to vibrate at the airframe's resonance frequency, any shock transmitted to the rotor system from contact with the ground can further increase the lead or lag of one or more of the blades, thereby causing the rotor system's center of gravity to be displaced from the center of rotation. These violent oscillations can lead to a catastrophic self-destruction of the helicopter within a matter of seconds.

Rotary damper systems have been developed to minimize this effect by damping the lead lag motion of articulated rotor blades. Damping such motion helps stabilize the rotor blades and prevent an irregular spacing between the blades that leads to oscillation induction. Conventional rotary dampers include hydraulic dampers having rotary bearing seals containing damping fluid used to damp system vibrations.

One problem associated with conventional rotary dampers is inadequate sealing of the damper liquid within the hydraulic chambers. In some instances, the use of bearings in traditional dampers has proven to produce unreliable sealing. Unreliable sealing leads to fluid loss, which creates the need for inspection and maintenance on a frequent and routine basis.

To solve this problem, traditional dampers have incorporated internal elastomer seals to contain the damper liquid, but continue to rely on bearings for overall damping functions. This is also problematic as using more parts per rotary damper has led to higher costs and more complicated designs to produce effective sealing and damping during operation.

A further problem associated with traditional rotary dampers is that during routine inspections, traditional dampers must be entirely removed from the rotary wing system in order to be inspected for sealing damage and replacement. Continued removal of the entire damper during its lifetime can decrease quality and/or lifetime of the parts associated with the damper as parts may become loosened or stripped during removal. In addition, as some features of the rotary damper are not visible from the exterior, some degradation may not be detected.

Accordingly, a need exists for rotary dampers and systems having a high reliability and long service life. A need exists for rotary dampers and systems that maximize the performance capabilities of high elastic stiffness and high damping with minimal variations over the operating temperature range of the helicopter. A need exists for rotary dampers and systems with installation characteristics allowing for efficient inspection of elastomer sections without the need for special inspection equipment or removal of the damper from the rotor assembly.

SUMMARY

In accordance with the disclosure provided herein, novel rotary wing aircraft rotary lead lag dampers, systems, and related methods are provided.

In some embodiments, a novel rotary damper for use in a rotary wing aircraft includes a housing and a rotor assembly disposed inside the housing. In some embodiments, the rotary damper further includes at least one resilient member disposed adjacent to an outer portion of the housing. In some embodiments, the housing of the rotary damper includes a canister body or canister member and one or more canister fixation members adapted to attach to portions of a rotary wing control arm. In some embodiments, the at least one resilient member is externally visible from outside of (e.g., exterior to) the rotary damper.

In some embodiments, a rotary damper system for use in a rotary wing aircraft is provided. The rotary damper system includes a plurality of rotary wings and a plurality of rotary dampers disposed proximate the plurality of rotary wings. In some embodiments, each rotary damper includes a housing and a rotor assembly disposed within the housing. In some embodiments, each rotary damper further includes at least one resilient member disposed adjacent to an outer portion of the housing. In some embodiments, the at least one resilient member is externally visible from outside of the rotary damper.

In some embodiments, a method of providing a rotary damper is disclosed. The method includes providing a housing and positioning a rotor assembly inside the housing. In some embodiments, the method further includes providing at least one resilient member adjacent to an outer portion of the housing. In some embodiments, the resilient member is disk shaped. In some embodiments, the at least one resilient member is externally visible from outside of the rotary damper.

DETAILED DESCRIPTION

Numerous objects and advantages of the subject matter will become apparent as the following detailed description of the preferred embodiments is read in conjunction with the drawings, which illustrate such embodiments.

The subject matter disclosed herein is directed to novel rotary dampers, systems. For ease of understanding, the non-limiting example of a rotary aircraft is used throughout to include the device, and related methods for use and installation within a rotary wing aircraft. However, it is understood that the system described herein is applicable to any system having a rotary damper. For example, other applications include but are not limited to civil, industrial, and automotive, including any application where damping is needed for control of vibrations where a torsional damper would be preferred.

In some embodiments, novel rotary dampers provided herein include one or more resilient members adapted to dynamically seal damping fluid within the rotary damper, while being externally visible. Incorporation of resilient members within portions of rotary dampers decreases both the cost and weight associated with providing dampers. In addition, as the resilient members are externally visible, rotary dampers provided herein have improved ease of inspection, as the dampers do not need to be removed from the rotary winged aircraft to inspect and do not require specialized inspection equipment.

In some embodiments, the resilient members are partially visible, uncovered, or substantially unobstructed from view about an outer perimeter of a rotary damper. In some embodiments, the resilient members are at least substantially or fully visible about the outer perimeter of a rotary damper.

In some embodiments, the resilient members include elastomer or elastomeric materials improving the stiffness of rotary dampers and systems provided herein. Improved stiffness, as a result of elastomer materials, results in low damping and provides minimal change in stiffness over the operating temperature range of the helicopter.

In some embodiments, the resilient members are tapered. In some embodiments, the resilient members are substantially disk shaped, and include torsional springs having a high elastic stiffness.

In some embodiments, the resilient members are installed by sliding each member in horizontally from a side of the damper.

Reference is made in detail to possible aspects or embodiments of the subject matter herein, one or more examples of which are shown in the figures. Each example is provided to explain the subject matter and not as a limitation. In fact, features illustrated or described as part of one embodiment is used in another embodiment to yield still a further embodiment. It is intended that the subject matter disclosed and envisioned herein covers such modifications and variations.

Figure 5A:
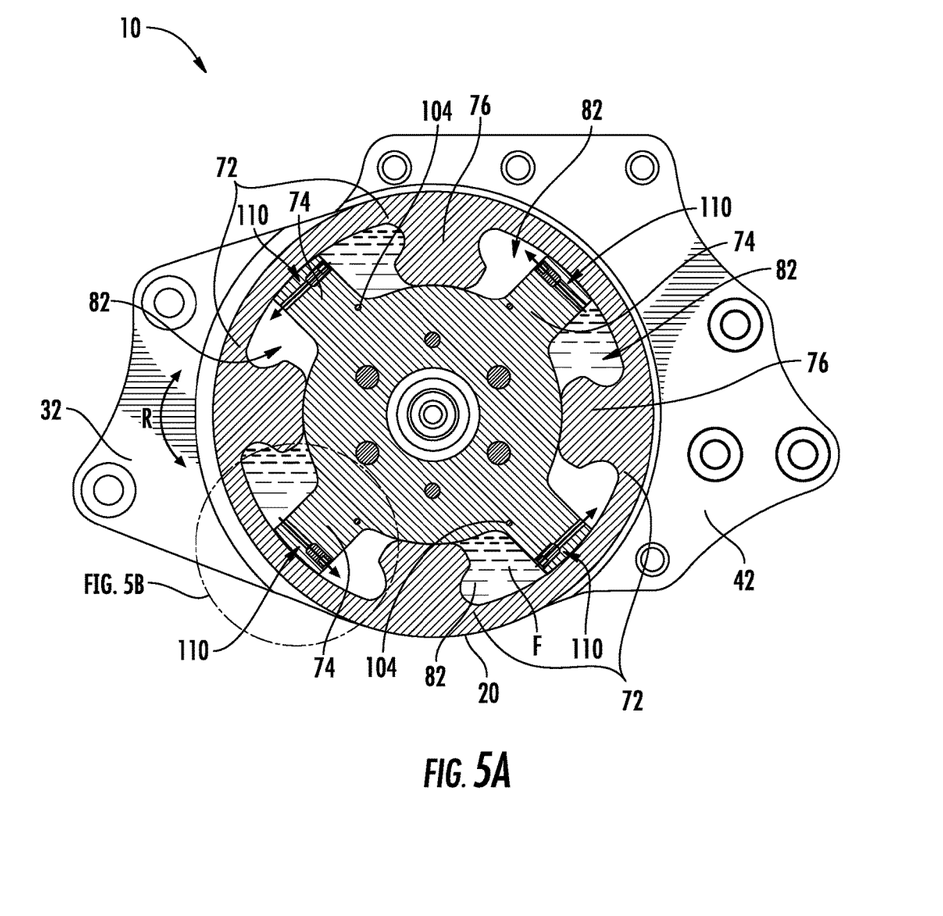
FIG. 5A is a sectional view illustrating a rotary damper according to some embodiments.
Figure 5B:
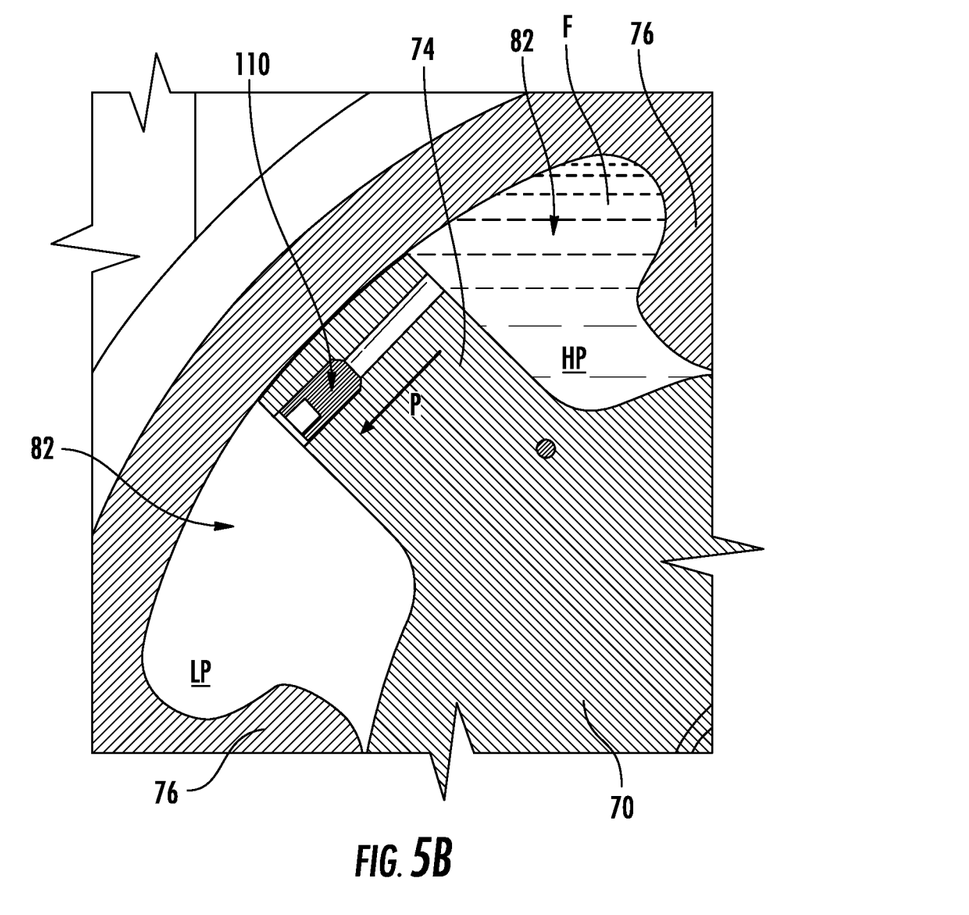
FIG. 5B is a detailed view illustrating a primary liquid orifice as seen in FIG. 5A.
Figure 6A:
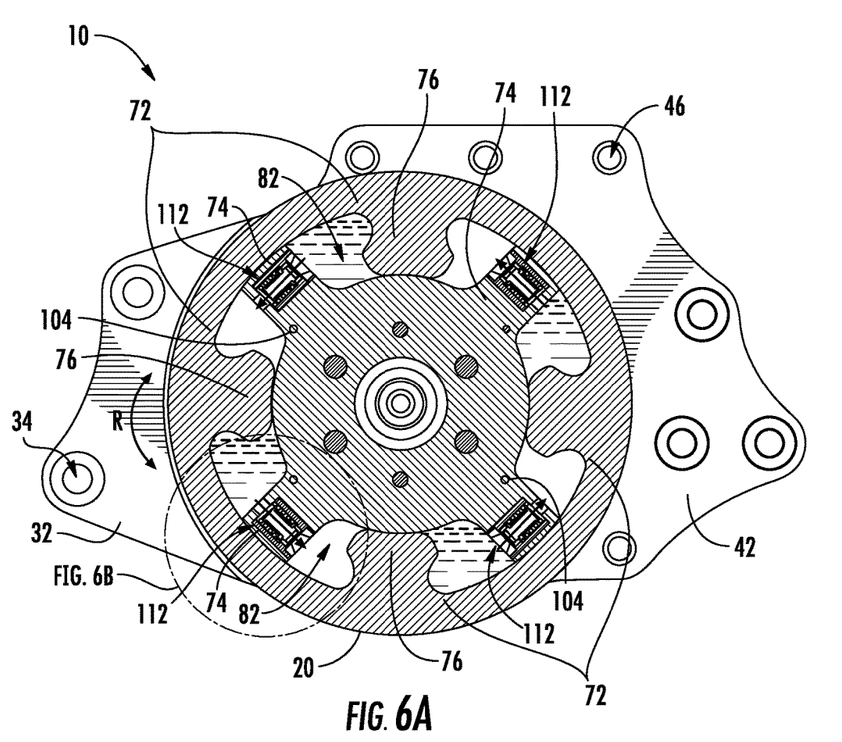
FIG. 6A is a sectional view illustrating a rotary damper according to some embodiments.
Figure 6B:
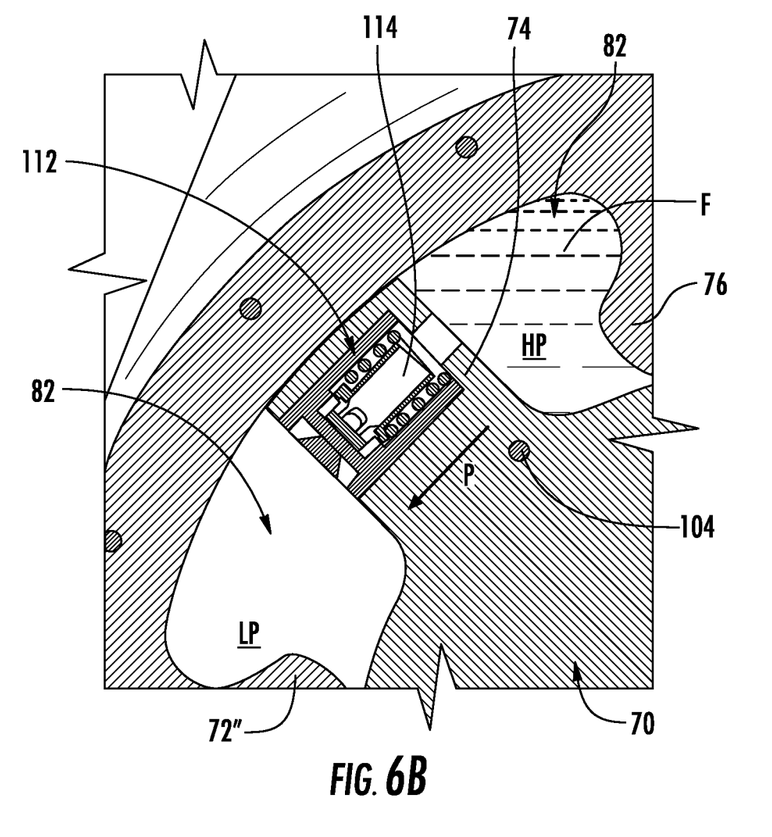
FIG. 6B is a detailed view illustrating a two-way liquid pressure relief valve as seen in FIG. 6A.
Figure 7:
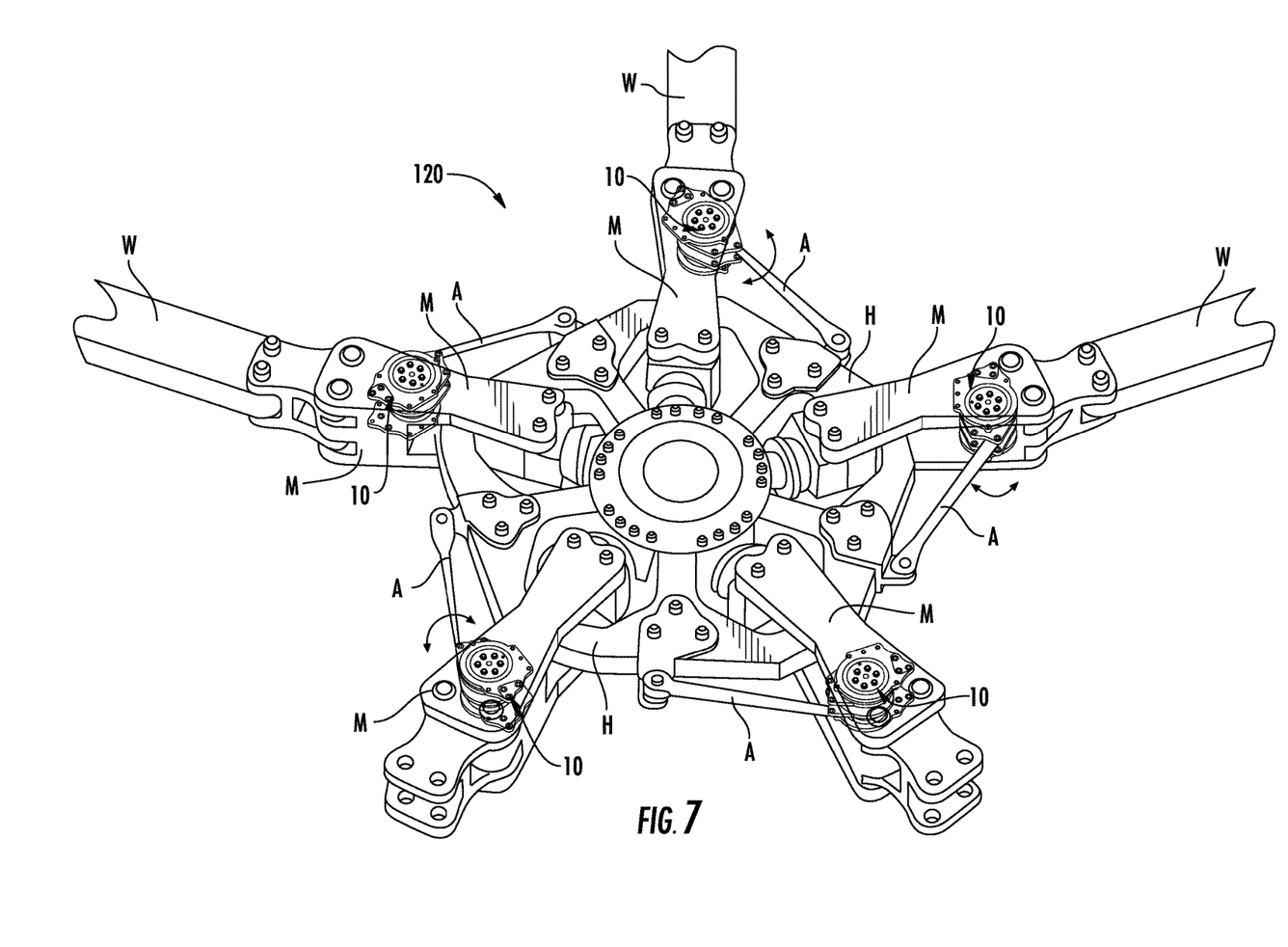
FIG. 7 illustrates one or more rotary dampers incorporated into an aircraft rotary wing system according to some embodiments.

FIGS. 1 to 7 illustrate various views and/or features associated with rotary lead lag dampers or damper systems associated with rotary wing aircraft. In some embodiments such as illustrated in FIGS. 1 to 4, a rotary damper generally designated 10 is provided. Rotary damper 10 includes an outer housing comprising an outer canister member 20 disposed between one or more canister fixation members. Canister member 20 includes a non-elastomeric material, such as a metal or metal alloy and configured to house one or more volumes of damping fluid F as illustrated in FIGS. 4 to 6B. Damping fluid F (FIGS. 4 to 6B) is adapted to flow in response to pressure differentials within rotary damper 10 to damp lead lag motions associated with articulated rotor blades of a rotary wing aircraft (FIG. 7). Damping fluid F (FIGS. 4 to 6B) is configured to damp the lead lag motion associated with the aircraft, for preventing of catastrophic failure of the aircraft caused by ground resonance phenomena.

In some embodiments, canister member 20 is disposed between one or more canister fixation members. For example, canister member 20 is disposed between a first, upper canister fixation member 30 and a second, lower canister fixation member 32. Canister member 20 is integrally formed with portions of upper and lower canister fixation members 30 and 32 for forming an outermost housing. In other embodiments, canister member 20 include a discrete body of material coupled to portions of canister fixation members 30 and 32 via one or more mechanical fastening members, such as one or more bolts, nuts, screws, combinations thereof, or via metal-to-metal adhesive, solder, or via welding.

Upper and lower canister fixation members 30 and 32 include a non-elastomeric material such as a metal or metal alloy. In some embodiments, upper and lower canister fixation members 30 and 32 are integrally formed with and/or include the same material as canister member 20. In other embodiments, canister fixation members 30 and 32 include discrete members that are either the same as and/or a different material than canister member 20. Upper and lower canister fixation members 30 and 32 are adapted to engage and/or connect to a portion of a rotary wing control arm A (FIG. 7). In some embodiments, upper and lower canister fixation members 30 and 32 include one or more openings, holes, or apertures, generally designated 34 disposed in a connecting end of upper and lower canister fixation members 30 and 32, respectively. Apertures 34 defined in upper canister fixation member 30 are at least partially aligned over apertures 34 defined in lower canister fixation member 32. These openings serve as points of physical and mechanical linkage or connection between portions of upper and lower canister fixation members 30 and 32 portions of rotary wing control arm A (FIG. 7). Thus, rotation of rotary wing control arm A causes rotation of and/or transfer of motion to upper and lower fixation members 30 and 32, respectively.

In some embodiments, portions of upper and lower canister fixation members 30 and 32 are physically and mechanically attached or connected to at least one rotary wing control arm A (FIG. 7) via provision of one or more mechanical fastening members through portions of apertures 34 aligned between upper and lower canister fixation members 30 and 32. Fastening members positioned through apertures 34 may mechanically connect portions of canister fixation members 30 and 32 to portions of rotary wing control arm A (FIG. 7). Mechanical fastening members may include bolts, nuts, clips, pins, screws, rivets, hooks, combinations thereof, and/or any other suitable member adapted to mechanically couple various components. Lead lag motions from control arm A are transferred to rotary damper 10 via canister fixation members 30 and 32 and fluid F contained therein as shown, for example in FIG. 7, thereby allowing rotary damper 10 to damp the motions.

In some embodiments as illustrated in FIGS. 1-4, rotary damper 10 further includes one or more machine fixation members adapted to fixedly couple a portion of rotary damper 10 to a portion of a rotary wing aircraft, such as a portion of a helicopter. In one aspect, the one or more machine fixation members include a first, upper machine fixation member 40 and a second, lower machine fixation member 42. Upper and lower machine fixation members 40 and 42 include a non-elastomeric material, such as a metal or metal alloy. Each of the upper and lower machine fixation members 40 and 42 include a connecting end extending therefrom, generally designated 44. Connecting ends 44 of upper and lower machine fixation members 40 and 42 may at least partially align with respect to each other and be disposed on a same side of rotary damper 10 opposite from where the one or more apertures 34 of canister fixation members are located.

In some embodiments, each of upper and lower machine fixation members 40 and 42, respectively, include one or more apertures, generally designated 46. Apertures 46 are disposed in portions of connecting end 44 of each fixation member. In addition, apertures 46 are at least partially disposed proximate outermost edges of and/or about a perimeter of upper and lower fixation members 40 and 42. In some embodiments, apertures 46 disposed in upper fixation member 40 may at least partially align over apertures 46 disposed in lower fixation member 42. Upper and lower machine fixation members 40 and 42 include uppermost and lowermost portions of rotary damper 10. That is, upper and lower machine fixation members 40 and 42 may physically and fixedly connect to portions of a rotary wing case member M (FIG. 7) via apertures 46 such that rotary damper 10 is fully contained therebetween.

Fastening members are positioned through apertures 46 for mechanically connecting portions of machine fixation members 40 and 42 to portions of rotary wing case member M (FIG. 7). Mechanical fastening members may include, for example, bolts, nuts, clips, pins, screws, rivets, hooks, combinations thereof, and/or any other suitable member adapted to mechanically couple different components. The physical linkage or connection between machine fixation members 40 and 42 transfers vibrational motions associated with rotary wing case member M, such as a pitch case or tension link of a helicopter, to rotary damper 10 such that the lead lag motion of a given rotary wing blade or wing W (FIG. 7) is damped. Rotary damper 10 includes any suitable size and may vary in size depending upon the type of rotary wing aircraft used. In some embodiments, rotary damper ranges in regards to an outermost diameter, for example, from about 120 millimeters (mm) to about 350 mm, or from about 4 inches (") to about 15".

Still referring to FIGS. 1-4, rotary damper 10 includes at least one resilient and/or elastomeric member, for example, at least one resilient and/or elastomeric torsional disk or spring member adapted to twist during rotation of canister fixation members. Resilient and/or elastomeric torsional disk or spring member is also adapted to dynamic seal portions of upper and lower machine fixation members 40 and 42 and portions of canister member 20, while also providing stiffness to improve the damping characteristics of rotary damper 10. In some embodiments, rotary damper 10 includes a first resilient member 50 and a second resilient member 52. Each of the first and second resilient members 50 and 52, respectively, include an elastomer or an elastomeric material. In some embodiments, first and second resilient members 50 and 52 are disposed adjacent on or about outer portions of the housing of rotary damper, for example, adjacent outermost diameters of canister member 20 and/or adjacent portions of upper and lower fixation members 30 and 32. Elastomers and/or elastomeric materials exhibit high elastic stiffness values, which are advantageous when incorporated into rotary damper 10 for providing very low damping. Elastomers and/or elastomeric materials are also advantageous when incorporated into rotary damper 10 for exhibiting a minimal change in stiffness over an operating temperature range of the helicopter, which may vary between approximately −40 degrees F. and +160 degrees F.

In some embodiments, first and second resilient members 50 and 52 include a rubber or rubber material, such as natural rubber, NEOPRENE®, nitrile rubber, isoprene rubber, butadiene rubber, chloroprene rubber, butyl rubber, polyacrylic rubber, silicone rubber, fluorosilicone rubber, fluoroelastomers, polyether block amides, ethylene-vinyl acetate, thermoplastic elastomers, resilin, elastin, polysulfide rubber, combinations thereof, and/or any other suitable elastic and/or resilient material. In some embodiments, first and second resilient members 50 and 52 exhibit a relatively high stiffness or spring rate, which is calculated from the ratio of stress to strain, expressed in Newtons (N) per mm. It may depend on the material's modulus, and also on the shape of the resilient member (e.g., the disk shape).

In some embodiments, first and second resilient members 50 and 52 are configured to provide a high elastic stiffness and damping with minimal performance variation over a given operating temperature range within a helicopter, in particular at low damper rotation amplitudes (e.g., <1 degree) in order to prevent ground resonance. As operating temperatures may vary between approximately −40 degrees F. and +160 degrees F., resilient members 50 and 52 are advantageous as mechanical properties associated with elastomers may prevent significant physical degradation or adverse changes within each resilient member during operation at such temperatures and/or sub-ranges thereof.

In some embodiments, each of the first and second resilient members 50 and 52 include a suitable structure such as a torsional disk or a torsional spring member, which is at least partially disposed about external portions of rotary damper 10. In some embodiments, first and second resilient members 50 and 52 include torsional spring members adapted to twist and/or be loaded in torsional shear during rotation of canister fixation members while dynamically sealing damping fluid within damper 10. In some embodiments, first and second resilient members 50 and 52 are disposed about external portions of rotary damper 10 such that each is visible from the outside, or externally visible with respect to damper 10. In some embodiments, the resilient members re installed by sliding each member in horizontally from a side of the damper. In some embodiments, upper machine fixation member 40 and upper canister fixation member 30 are spaced apart such that a portion of first resilient member 50 is visible at least approximately 360° about the perimeter and/or circumference of rotary damper 10. In some embodiments, lower machine member 42 and lower canister fixation member 32 are also positioned or spaced apart such that portions of second resilient member 52 are visible at least approximately 360° about the perirreter and/or circumference of rotary damper 10.

In some embodiments, a distance between upper machine fixation member 40 and upper canister fixation member 30 is approximately equal to the thickness of the first resilient member 50, as it is possible to position these members without requiring an intermediary structure or attachment surface between upper fixation member 40, first resilient member 50, and upper canister fixation member 30. In some embodiments, lower canister fixation member 32, second resilient member 52, and lower machine fixation member 42 are similarly disposed. Such placement is advantageous, as first and second resilient members 50 and 52 may be visually inspected for damage (e.g., cracking, having breaks or gaps, failing to seal) without having to physically remove rotary damper 10 from the aircraft and/or without requiring special inspection equipment. That is, in some embodiments rotary damper 10 is disposed within a wing case member M (FIG. 7) such that the damper 10 is installed without any visible obstruction of first and second resilient members 50 and 52, by any portion of the wing case member M.

Figure 3:
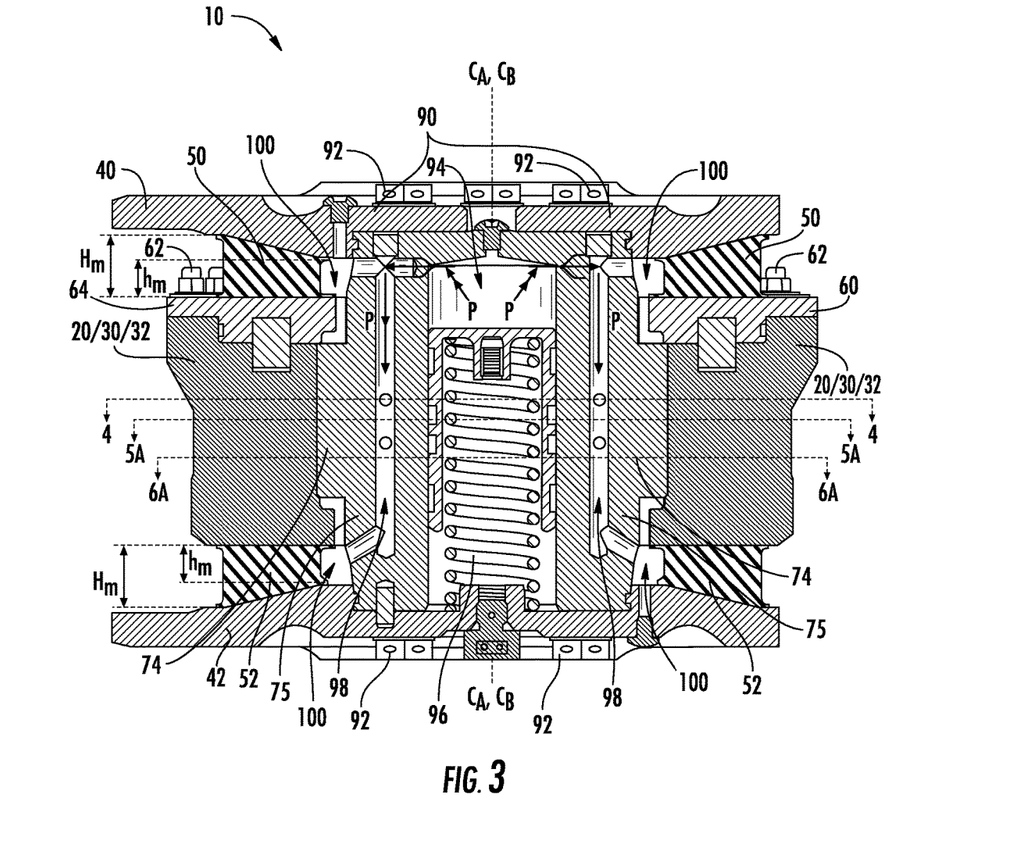
FIG. 3 is a sectional view illustrating a rotary damper according some embodiments.

First resilient member 50 is disposed between portions of upper machine fixation member 40 and upper canister fixation member 30 for providing dynamic sealing therebetween. Second resilient member 52 is disposed between portions of lower machine fixation member 42 and lower canister fixation member 32 for providing dynamic sealing therebetween. As discussed further below, first and second resilient members 50 and 52 may also dynamically seal damping fluid internally within damper 10, for example, within portions of solid state pressure chambers 100 (FIG. 3). First resilient member 50 is secured to portions of upper machine fixation member 40 and upper canister member 30, for example, via adhesive, glue, curable epoxy, physical attachment members, or fasteners such as screws, rivets, bolts, etc., combinations thereof, or by any other suitable fastener or attachment member. Similarly, second resilient member 52 is secured to portions of lower machine fixation member 42 and lower canister fixation member 32 for example via adhesive, glue, curable epoxy, physical attachment members, or fasteners such as screws, rivets, bolts, staples, clips, hooks, etc., combinations thereof, or by any other suitable fastener or attachment member/methodology.

Still referring to FIGS. 1-4 and in some embodiments, first and second resilient members 50 and 52 are disposed directly adjacent upper and lower machine fixation members 40 and 42, respectively. In some embodiments, resilient member 50 attaches to a portion of upper canister fixation member 30 via a primary attachment plate 60. One or more attachment members 62 or fasteners are disposed between portions of first resilient member 50 and portions of upper canister fixation member 30. Attachment members 62 include any suitable fastener known in the art, including for example a bolt, screw, rivet, pin, hook, clasp, clip, or nail. Where attachment member 62 includes a bolt, a correspondingly shaped nut is threaded about portions of each thereof. In some embodiments, canister member 20 and/or a housing comprised of canister member 20 and fixation members is disposed between portions of first and second resilient members 50 and 52.

Figure 1:
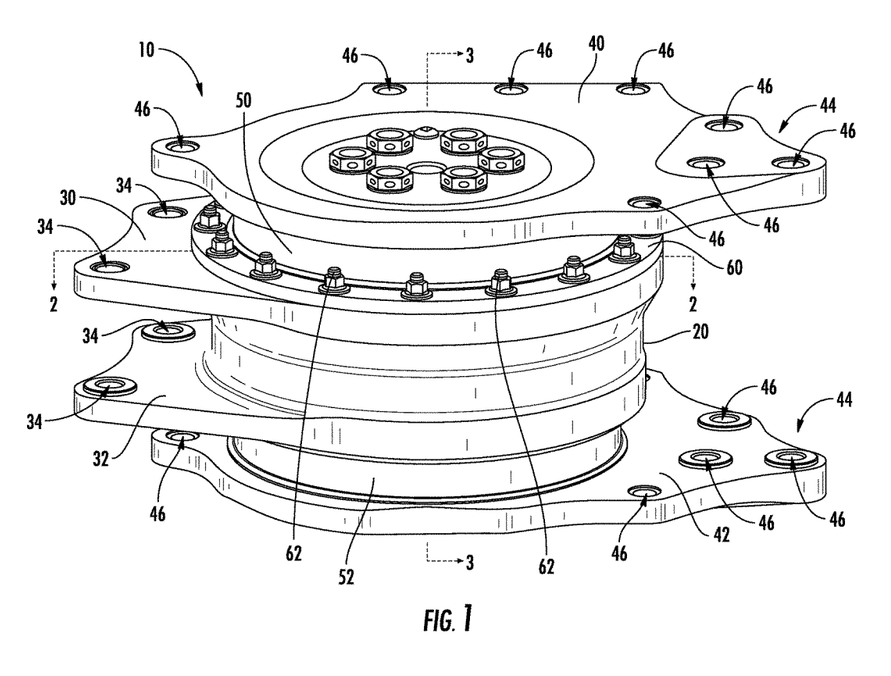
FIG. 1 is a side perspective view illustrating a rotary damper according to some embodiments.
Figure 2:
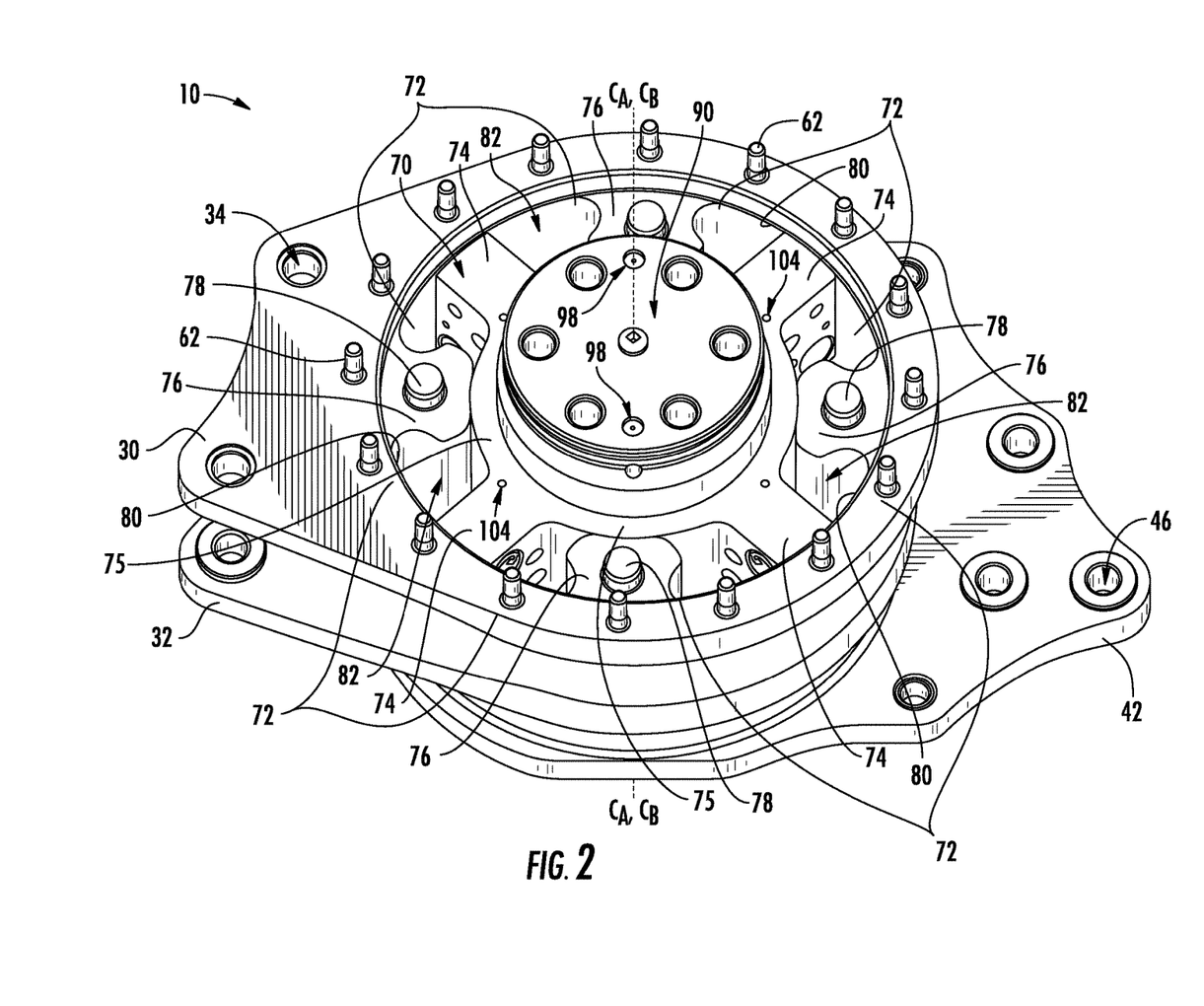
FIG. 2 is a top perspective view illustrating a rotary damper according to some embodiments.

In some embodiments including for example FIG. 2, a rotor assembly generally designated 70 is disposed within at least a portion of the housing including canister member 20 (FIG. 1). Rotor assembly 70 may, for example, include an elongated body substantially longitudinally aligned within a portion of canister member 20 (FIG. 1), and in some embodiments, rotor assembly 70 is centrally disposed with respect to and disposed along a central axis of rotation $C_A$ of rotary damper 10.

Rotary damper 10 includes at least one inner rotor assembly cavity 72 adapted to receive a portion of rotor assembly 70, for example, at least one radially extending rotor member 74. In some embodiments, at least one radially extending rotor member 74 extends outwardly from a rotary wheel 75, and each rotor member 74 is adapted for positioning in portions of each rotor assembly cavity 72. In some embodiments, each radially extending rotor member 74 divides each cavity 72 into more than one portion, such as two portions, for example. In some embodiments, a pressure differential is created between portions of cavity 72 during operation of damper 10. In some embodiments, rotary damper 10 further includes at least one radially extending divider 76 adapted to engage a portion of rotor assembly 70. The least one divider 76 extends from portions of canister member 20 (FIG. 1) and fixation members 30 and 32 inwardly toward axis of rotation $C_A$ of rotary damper 10.

In some embodiments, each radially extending rotor member 74 and each divider 76 include a non-elastomeric material, such as metal or metal alloy. Rotary damper 10 includes one or more dividers 76, such as, for example, two radial dividers including a first radially extending divider and a second radially extending divider. In some embodiments, rotary damper 10 includes more than two dividers 76, such as, for example, three radial dividers including a first, a second and a third radially extending divider. For illustration purposes, rotary damper 10 is shown as comprising four dividers 76; however, more or less than four dividers 76 are contemplated. Dividers 76 are spaced apart at uniform increments, or at non-uniform (e.g., different) increments.

In some embodiments, each radially extending divider 76 is integrally formed with portions of canister member 20 and/or upper and lower canister fixation members 30 and 32, respectively. Each divider 76 may optionally be attached to portions of primary attachment plate 60 (FIG. 1) and upper canister fixation member 30 via one or more attachment members 78 disposed between portions of the radially extending dividers 76 and attachment plate 60 (FIG. 1). Attachment members 76 include any suitable fastener known in the art, including for example a bolt, screw, rivet, pin, hook, clasp, clip, nail, combinations thereof, or other suitable fastener.

Still referring to FIG. 2 inner rotor assembly 70 includes an axis of rotation $C_B$ that in some embodiments, is coincident with a first axis of rotation, including $C_A$ of rotary damper 10. Inner rotor assembly 70 includes at least one radially extending rotor member 74 that projects outwardly from a center of inner rotor assembly 70 towards an outermost wall or outermost point along the diameter of canister member 20 of damper 10. In some embodiments, rotor member 74 extends outwardly from a center of damper 10 towards, and contacts, a portion of an inner wall 80 of inner rotor assembly receiving cavity 72. Inner rotor assembly 70 of rotary damper 10 includes at least one radially extending rotor member 74, more than one radially extending rotor member 74, more than two radially extending rotor members 74, or more than four radially extending rotor members 74, although for illustration purposes, four are shown. Any number of radially extending rotor members 74 is provided. Radially extending rotor members 74 are spaced apart at uniform increments or non-uniform increments.

In some embodiments, a portion of inner rotor assembly 70 is received in portions of inner rotor assembly receiving cavity 72 in such a way that the radially extending rotor members 74 and radially extending dividers 76 form variable volume chambers, generally designated 82. That is, each cavity 72 is divided into one or more portions, including one or more variable volume chambers 82.

In some embodiments, inner rotor assembly 70 further includes and/or is provided about a backfill system 90 adapted to maintain positive pressure of the damper liquid contained in the rotary damper 10. In some embodiments, rotary damper 10 includes one or more pressure equalization ports 98 disposed in portions of backfill system 90. Damping fluid is adapted to flow between areas of high and low pressure in efforts to equalize pressure via pressure equalization ports 98. Damping fluid is adapted to flow between pressure equalization ports 98 and one or more check valve orifices 104 offset and radially disposed in portion of rotor assembly 70. In some embodiments, pressure equalization ports 98 and check valve orifices 104 are substantially parallel within portions of rotary damper 10.

In some embodiments, a plurality of radially extending rotor members 74 and a plurality of radially extending dividers 76 are provided in rotary damper 10. Radially extending rotor members 74 are also referred to as rotor vanes 74. The plurality of radially extending rotor members 74 is provided between the plurality of radially extending dividers 76, such that at least a first radially extending rotor of the plurality of rotor members 74 is disposed between a first and a second radially extending divider of the plurality of radially extending dividers 76, thereby forming a first variable volume chamber of a plurality of variable volume chambers 82. Each variable volume chamber 82 of a plurality of chambers is configured to contain a damping fluid or liquid, generally designated F (FIGS. 4 to 6B). Damping fluid F include any suitable material, including for example an oil or oil-based material, a silicone or silicon-based material, smart fluids (e.g., magneto-rheological MR fluid), or any other suitable liquid for damping vibrations, movements, or motions.

Referring to FIG. 3, backfill system 90 is adapted to maintain positive pressure of a damping liquid or damping fluid F (FIGS. 4 to 6B) contained within portions of rotary damper 10. Backfill system 90 includes a top plate having one or more openings, holes, or apertures generally designated adapted to receive one or more attachment members 92. Attachment members 92 may attach a portion of backfill system 90 to upper and/or lower machine fixation members 40 and 42. Attachments members 92 include any suitable fastener known in the art, including for example a bolt, screw, rivet, pin, hook, clasp, clip, nail, or combinations thereof.

In some embodiments, backfill system 90 includes a volume compensator 94 adapted to apply and maintain a steady state pressure applied to damping fluid F by providing conduits for fluid to communicate between chambers 82 (FIG. 2). Backfill system 90 may further include a compensator, such as for example, a spring-driven piston compensator 96 disposed within a portion of volume compensator 94. In some embodiments, piston compensator 96 attaches to portions of lower machine fixation member 42. Volume compensator 94 is in liquid communication with variable volume chambers 82 via pressure equalization ports 98 that may be disposed in portions of rotor assembly 70.

Figure 4:
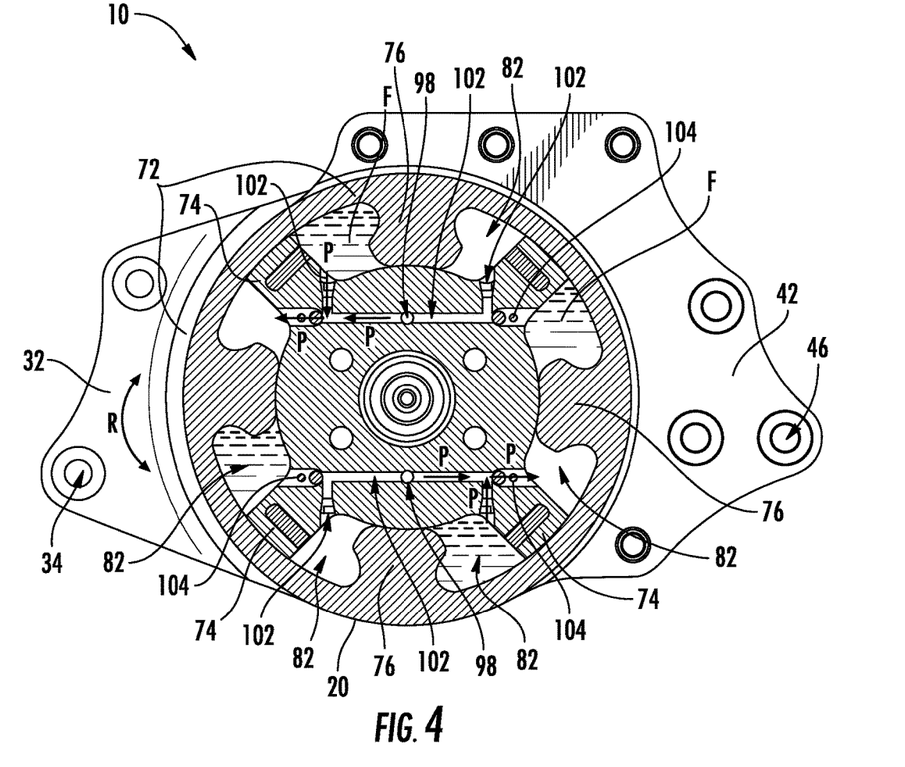
FIG. 4 is a top sectional view illustrating a rotary damper according to some embodiments.

In some embodiments, pressure equalization ports 98 extend internally within portions of rotor assembly and connect to one or more positive pressure chambers 100 for moving damping fluid therebetween. In some embodiments, pressure equalization ports 98 include conduits by which damping fluid F (FIGS. 4-6B) communicates between portions of volume compensator 94 and variable volume chambers 82 via one or more liquid bleed orifices 102 (FIG. 4) and/or check valve orifices 104 (FIGS. 2, 4). That is, damping fluid F (FIG. 4) may move between portions of pressure equalization ports 98, liquid bleed orifices 102, and check valve orifices 104 in response to rising or dropping pressure for equalizing pressure and damping lead lag motions associated with a rotary winged aircraft.

In some embodiments, as illustrated in FIG. 3, a direction of fluid flow as it would exit volume compensator 94 during operation may flow along portions of pressure equalization ports 98 between one or more positive pressure chambers 100 in response to positive pressure supplied by volume compensator 94. At least one or more positive pressure chambers 100 are at least substantially vertically aligned within damper 10. Notably, damping fluid is communicated within backfill system 90 between portions of volume compensator 94, liquid bleed orifices 102, and the check valve orifices 104, each of which can allow rotary damper 10 to operate at a low pressure, thereby increasing the operating range of rotary damper 10 and thereby improving the safety of the rotary damper 10.

In some embodiments as illustrated in FIG. 3, first and second resilient members 50 and 52, respectively, include any suitable height and/or thickness and are at least substantially or fully visible outside of rotary damper 10. In some aspects, first and second resilient members 50 and 52 are uncovered, exposed, and/or substantially unobstructed from view outside of rotary damper 10. In some embodiments, each of first and second resilient members 50 and 52 include, for example, a maximum height $H_M$ of approximately 5 mm or more. Each of first and second resilient members 50 and 52 taper from maximum height $H_M$ proximate an outermost diameter of damper 10 housing to a minimum height $h_m$ proximate a center of damper 10. Tapered first and second resilient members 50 and 52 improve ease of installation or assembly with respect to damper 10, reduce weight, and provide torsional springs, which may be only loaded in torsional shear. Shear loading may be preferred since it provides an almost linear spring constant up to strains of about 200 percent. This linearity is constant with frequency for both small and large dynamic shear strains. Notably, first and second resilient members 50 and 52 are adapted to dynamically seal damping fluid internally within portions of steady state pressure chambers 100 as well externally seal portions of canister member 20 between upper and lower housing fixation members 40 and 42.

In some embodiments, first and second resilient members 50 and 52 are positioned such that external surfaces of each member are proximate an outer diameter of damper 10. This may advantageously allow first and second resilient members 50 and 52 to be easily inspected while damper 10 remains installed in the aircraft rotor. Installation into a helicopter rotor allows on-condition inspection of the elastomer resilient members (e.g., 50, 52) without the need for special inspection equipment or removal of damper 10 from the helicopter. In some embodiments, externally visible first and second resilient members 50 and 52, respectively, improve the ease of inspection as cracks, gaps, or sealing failures are visible from the outside of damper 10 without having to remove damper 10 from the helicopter. Thus, in some embodiments, damaged parts, including damaged resilient members, may be discovered and replaced on a more frequent basis because of the improved ease of inspection.

In some embodiments, each of each of first and second resilient members 50 and 52 includes a maximum height $H_M$ ranging, for example, between approximately 5 mm and approximately 12" and any sub-range or dimension therebetween, such as between approximately 5 mm and 10 mm, between approximately 10 mm and 100 mm, between approximately 2" and 4", between approximately 4" and 6", between approximately 6" and 8", or more than approximately 8". Any height(s) and/or thickness(es) of resilient members 50 and 52 may be provided. Maximum heights $H_M$ taper to minimum heights $h_m$ towards the center of damper 10. Minimum heights $h_m$ can vary between, for example, approximately 1 mm and 6", for example such as between approximately 1 mm and 10 mm, between approximately 10 mm and 20 mm, between approximately 20 mm and 100 mm, between approximately 2" and 4", or between approximately 4" and 6". Notably, the constant taper between maximum and minimum heights provides for balanced shear strain behavior, thereby further improving stiffness and overall damping capabilities.

In some embodiments, first and second resilient members 50 and 52 are disposed between portions of canister member 20 and machine fixation members 40 and 42 and are connected thereto via any suitable fastener or adhesive known in the art, including a rubber to metal adhesive. In some embodiments, canister member 20 is fully and/or partially disposed between portions of first and second resilient members 50 and 52, respectively. In some embodiments, first and second resilient members 50 and 52 provide dynamic sealing between portions of rotor assembly 70 (e.g., portions of positive pressure chambers 100) and canister member 20. First and second resilient members 50 and 52 provide improved retention of the damper liquid within the rotary damper 10 during its range of operating temperatures as compared to traditional tube form bearings. In addition, the disk-like shape of each resilient member, such as first and second resilient members 50 and 52, provides improved elastic stiffness by accommodating relative motion between rotor assembly 70 and canister member 20. In addition, the disk-like shape and external placement of first and second resilient members 50 and 52 makes it substantially unreactive to damper loads (e.g., as it is not centrally disposed within damper 10), such that resilient members are loaded in torsional shear.

As described above, in some embodiments, first and second resilient members 50 and 52 may uniformly taper between maximum and minimum heights creating a constant shear strain in the resilient member section, thereby maintaining a constant rate of deformation in the resilient members and maximizing the fatigue life of the resilient member. In some embodiments, first and second resilient members 50 and 52 include, for example, a tapered cross-sectional profile that tapers inwardly and/or downwardly toward the axis of rotation $C_A$ of damper 10. In some embodiments, first and second resilient members 50 and 52 have a substantially circular and disk shape. The disk shape maximizes upper and lower surface load area characteristics of the resilient members, thereby providing higher stiffness characteristics and allowing the resilient members to act as dynamic springs during the operation of the rotary damper 10.

In some embodiments, as shown in FIGS. 4 to 6B, damping fluid F is communicated between volume compensator 92 and one or more variable volume chambers 82 via one or more passages, channels, conduits, and/or orifices which may include one or more liquid bleed orifices 102 (FIG. 4), one or more primary liquid orifices 110 (FIGS. 5A and 5B), one or more check valve orifices 104 (FIG. 4), and/or one or more relief valve orifices 112 (FIGS. 6A and 6B). Damping fluid F includes or consists of any suitable fluid or liquid known to the art, including for example and without limitation, a silicone or silicone-based liquid with high viscosity, operability at a wide temperature range, and high lubrication characteristics. The communication of damping fluid F between variable volume chambers 82 creates a damping force on radially extending rotor members 74 and the radially extending dividers 76 such that the overall lead lag motion of the rotary wing is damped during operation of the aircraft, thereby preventing the development of ground resonance phenomena.

In some embodiments as shown in FIG. 4, during operation damper 10, damping fluid F follows along one or more paths P during changes in pressure. Damping fluid F may flow from areas of high pressure (indicated in hatched lines) to areas of lower pressure (in white) via one or more orifices. Thus, volume of damping fluid F within a first variable volume chamber 82 becomes lessened as pressure increases in that chamber, and volume of damping fluid F will increase to areas of lower pressure in, for example, an adjacent variable volume chamber 82. That is, in some embodiments damping fluid F may flow between adjacent chambers 82 via orifices, and may move from areas of high pressure into areas of lower pressure, increasing volume within the latter.

In some embodiments, one or more liquid bleed orifices 102 is disposed between portions of adjacent chambers 82 and is adapted to restrict flow of damping fluid F such that positive pressure build-up is prevented in a first variable volume chamber. The flow of liquid depicted in FIG. 4 is the result of the relative movement of the housing comprised of canister member 20 and canister fixation members 30 and 32 in a counter-clockwise rotational movement or direction designated R. Rotational movement R is communicated from the helicopter to damper 10 via the attachment of upper and lower canister fixation members 30 and 32 to control arm A (FIG. 7).

Upper and lower machine fixation members 40 and 42 are fixedly held between portions of wing case member M (FIG. 7) as rotary damper 10 housing or canister member 20 rotates via motion transmitted to upper and lower fixation members 30 and 32. Liquid bleed orifices 102 include paths that are substantially orthogonal to one or more pressure equalization ports 98 and/or one or more check valve orifices 104. In some embodiments, liquid bleed orifices 102 are adapted to connect portions of pressure equalization ports 98 to portions of check valve orifices 104. In some embodiments, liquid bleed orifices 102 are adapted to extend through portions of rotor member 74 and/or portions of volume compensator 94.

Still referring to FIG. 4, one or more check valve orifices 104 is disposed in one or more radially extending rotor members 74. Check valve orifices 104 are adapted to restrict flow of damping fluid F from volume compensator 94 as the pressure internal a high pressure variable volume chambers 82 decreases to below the positive pressure internal to the rotary damper 10. Notably, the liquid communication restricted by liquid bleed orifices 102 and check valve orifices 104 allows backfill system 90 to remain dynamically isolated from the pressure differentials generated in the variable volume chambers 82 caused by the relative motion between the radially extending dividers 76 and the radially extending rotor member 74.

In some embodiments as illustrated in FIGS. 5A and 5B, each radially extending rotor member 74 include at least one primary liquid orifice 110. Primary liquid orifices 110 are adapted to restrict flow through the radially extending rotor members 74 and between the variable volume chambers 82. For example, in some embodiments a first primary liquid orifice 110 is disposed between two adjacent variable volume chambers 82. In some embodiments, each primary liquid orifice 110 is adapted to provide liquid communication between adjacent variable volume chambers 82, such as between a first and a second variable volume chamber.

In some embodiments as illustrated in FIG. 5B, a pressure differential generated by the relative movement between the radially extending dividers 76 and the radially extending rotor members 74 forces damping fluid F to move from areas of high pressure HP, in a first variable volume chamber 82, through the primary liquid orifice 110 and to a second, adjacent variable volume chamber 82 at a lower pressure LP. Damping fluid F may flow as indicated by path P through portions of primary liquid orifice 110 and is restricted by a pressure-driven piston. Damping fluid F flows through primary liquid orifice 110 because of pressure differentials generated in variable volume chambers 82 by the relative motion between radially extending dividers 76, and radially extending rotor members 74, as canister member 20 (FIG. 5A) moves in the counterclockwise rotational direction R (FIG. 5A) with respect to the axis of rotation $C_A$ (FIG. 3) of rotary damper 10.

In some embodiments as illustrated in FIGS. 6A and 6B, rotary damper 10 may further include one or more liquid relief valve orifices 112 disposed in portions of radially extending rotor members 74. Liquid relief valve orifices 112 are disposed between adjacent variable volume chambers 82. In some embodiments, liquid relief valve orifices 112 are adapted to restrict liquid flow through the rotor members 74 and between adjacent variable volume chambers 82. In some embodiments, two liquid relief valve orifices 112 are provided between each set of dynamic variable volume chambers 82 to limit the pressure differential across each rotor member 74 or rotor vane. In some embodiments, liquid relief valve orifices 112 provide a constant pressure differential across rotor members 74, in order to limit damper loads and minimize the performance variation over the operating temperature range of the aircraft. In some embodiments, fluid flow paths along orifices between rotor assembly 70 and housing and the fluid viscosity create a high pressure differential across the rotor members 74 at very low damper rotation amplitudes. This pressure differential is high enough to open liquid relief valve orifices 112, which allows liquid relief valve orifices 112 to control damping at low damper rotation amplitudes in order to prevent ground resonance.

In some embodiments, each liquid relief valve orifice 112 may open and close via a spring-driven relief valve member 114 as illustrated in FIG. 6B. In some embodiments, spring-driven relief valve member 114 is displaced by a sufficiently high pressure differential across the first radially extending rotor member 74. For example, when a pressure differential exists as shown in FIG. 6B between areas of high pressure HP and lower pressure LP, relief valve member 114 may compress and allow damping fluid F to flow from a first variable volume chamber 82 to a second, adjacent variable volume chamber 82 via liquid relief valve orifice 112. Notably, the communication of damper fluid via relief valve orifice 112 provides a constant pressure differential across radially extending rotor members 74 in order to limit the damping loads, thereby minimizing the performance variation over the operating temperature range of the rotary damper 10, and for preventing cracking pressure that would cause the catastrophic failure of rotor members 74 and/or the dividers 76.

In some embodiments, according to FIG. 7, an aircraft includes more than one rotary damper 10 installed therein/ thereon. In some embodiments, more than one rotary damper 10 is incorporated into a rotary wing system, generally designated 120. Each rotary damper 10 is disposed between a portion of a respective rotary wing case member M, such as a pitch case or tension link of a helicopter. In some embodiments, one rotary damper 10 is disposed proximate to and associated with each rotary blade or wing W of an aircraft. Notably, rotary damper 10 is externally visible or inspect-able for adequate sealing, cracks, gaps, and other failure mechanisms without having to disassemble rotary dampers 10 from rotary wing system 120. In some embodiments, each rotary damper 10 is installed into a rotary wing system 120 such that the upper and lower resilient members 50 and 52 (FIGS. 1, 3) is visually inspected during operation without removal of damper 10 from system 120. That is, in some embodiments rotary damper 10 is disposed within a wing case member M such that the damper 10 is installed without any visible obstruction or covering of first and second resilient members 50 and 52 by any portion of the wing case member M, such as a shroud cover, encasement, or enclosure. In some aspects, each resilient member 50 and 52 is fully visible about a perimeter of damper 10, or about the entire 360° viewing angle of damper. Notably, first and second resilient members 50 and 52 are slidably replaceable within portions of damper, thereby improving ease of installation.

In some embodiments, and during operation of a rotary wing aircraft, upper and lower canister fixation members 30 and 32 may rotate together as illustrated in double-sided arrows through a rotation angle relative to upper and lower machine fixation members 40 and 42. The machine fixation members 40 and 42 are stationary with respect to inner rotor assembly 70 (FIG. 3). As the rotary wing aircraft experiences vibrations in the rotary wing system 120, a rotary wing hub H transfers a corresponding force through control arms A. Control arm A may then transfer the force to rotary damper 10 via upper and lower canister fixation members 30 and 32. The force transferred via control arm A creates a relative motion of canister 20 relative to the machine fixation members 40 and 42, and the wing case member M. The rotation of the canister fixation members 30 and 32 damps the lead lag motion of the rotary wing by pressurizing and pumping damping fluid F (FIGS. 4 to 6B) through one or more bleed valve orifices 102, check valve orifices 104, primary liquid orifices 110, pressure equalization ports 98, positive pressure chambers 100, and/or relief valve orifices 112, thereby developing pressure differentials adapted to damp the overall motion of respective rotary wings W.

Rotary wing control arm A may move relative to a rotary wing case member M, such as a pitch case or tension link of a rotary wing aircraft. The point of connection of the upper and lower canister fixation members 30 and 32 to the control arm A translates lead and lag motions to rotary damper 10 via the canister member 20, thereby allowing damper 10 to damp the overall lead lag motion of each respective individual rotary wing W (FIG. 7). The relative motion between control arm A and the rotary wing case member M is shown, for example, in FIG. 7.

Embodiments, as disclosed herein, may provide one or more of the following beneficial technical effects: reduced cost providing a rotary damper; reduced weight of rotary damper; high reliability (i.e., <9×10-6 failures per flight hour); longer service life (i.e., >5000 hours); high elastic stiffness; damping with minimal performance variation over operating temperature range of a helicopter; externally visible from the rotary damper thereby improving ease of installation and inspection without the need to remove the damper from the helicopter; minimal change in stiffness over operating temperature range of helicopter; improved safety; improved operation at low positive pressure; improved load limiting capability that is independent of damper rotation amplitude and temperature, in order to reduce the loads on the damper and its mating component, therefore minimizing the overall weight of the rotor system.

While the present subject matter is described herein in reference to specific aspects, features, and illustrative embodiments, it will be appreciated that the utility of the subject matter herein is not thus limited, but rather extends to and encompasses numerous other variations, modifications and alternative embodiments, as will suggest themselves to those of ordinary skill in the field of the present subject matter, based on the disclosure herein. Various combinations and sub-combinations of the structures and features described herein are contemplated, and will be apparent to a skilled person having knowledge of this disclosure. Any of the various features and elements as disclosed herein may be combined with one or more other disclosed features and elements unless indicated to the contrary herein. Correspondingly, the subject matter herein as hereinafter claimed is intended to be broadly construed and interpreted, as including all such variations, modifications and alternative embodiments, within its scope and including equivalents of the claims.

What is claimed is:

1. A rotary damper, comprising:
a housing;
a rotor assembly disposed inside the housing; and
at least one resilient member disposed adjacent to an outer portion of the housing;
wherein the at least one resilient member is externally visible from outside of the rotary damper and the at least one resilient member is adapted to internally seal a damping fluid within a portion of the rotor assembly.

2. The rotary damper of claim 1, wherein the at least one resilient member comprises an elastomer.

3. The rotary damper of claim 1, wherein the at least one resilient member tapers from the outer portion of the housing towards a center axis of the rotor assembly.

4. The rotary damper of claim 1, wherein the at least one resilient member comprises a disk shape.

5. The rotary damper of claim 1, wherein the at least one resilient member further comprises a first resilient member and a second resilient member disposed adjacent to outer portions of the housing.

6. The rotary damper of claim 5, wherein the first resilient member is disposed between an upper canister fixation member of the housing and an upper machine fixation member.

7. The rotary damper of claim 5, wherein the second resilient member is disposed between a lower canister fixation member of the housing and a lower machine fixation member.

8. The rotary damper of claim 1, wherein the rotor assembly comprises an elongated body.

9. The rotary damper of claim 8, wherein at least one pressure equalization port is disposed within a portion of the elongated body.

10. The rotary damper of claim 8, wherein one or more check valve orifices are disposed within a portion of the elongated body.

11. The rotary damper of claim 1, wherein the rotor assembly comprises a volume compensator adapted to maintain a positive pressure within the rotary damper.

12. The rotary damper of claim 1, wherein the rotor assembly comprises a plurality of vanes disposed between a plurality of chambers.

13. The rotary damper of claim 12, wherein a primary orifice is disposed inside a portion of a first rotor of the plurality of vanes, wherein the primary orifice is adapted to connect a first and a second chamber of the plurality of chambers.

14. The rotary damper of claim 12, wherein a relief valve is disposed inside a portion of a first vane of the plurality of vanes, wherein the relief valve opens and closes in response to a pressure differential between a first and a second chamber of the plurality of chambers.

15. A method of providing a rotary damper, the method comprising:
providing a housing;
positioning a rotor assembly inside the housing; and
providing at least resilient member adjacent to an outer portion of the housing, the at least one resilient member being one disk shaped;
wherein the at least one resilient member is externally visible from outside of the rotary damper and the at least one resilient member is adapted to internally seal a damping fluid within a portion of the rotor assembly.

16. The method of claim 15, wherein the at least one resilient member comprises an elastomer.

17. The method of claim 15, wherein the at least one resilient member tapers from the outer portion of the housing towards a center axis of the rotor assembly.

18. The method of claim 15, wherein the providing of the at least one resilient member further comprises providing a first resilient member and a second resilient member, the first and second resilient members adjacent to an outer portion of the housing.

19. The method of claim 15, further comprising installing the rotary damper within a rotary winged aircraft proximate a blade of the rotary winged aircraft.

20. The method of claim 15, wherein providing at least one disk shaped resilient member comprises sliding at least one disk shaped resilient member into a portion of the rotary damper.

21. A rotary damper comprising:
a housing;
a rotor assembly disposed inside the housing, the rotor assembly including at least one radially extending rotor member positioned in at least one rotary assembly cavity;
at least one primary liquid orifice disposed in a portion of the at least one rotor member;
at least one pressure equalization port disposed within a portion of the rotor assembly; and
at least one liquid bleed orifice connected to the at least one pressure equalization port.

22. The rotary damper of claim 21, wherein the at least one pressure equalization port is connected to at least one check valve orifice.

23. The rotary damper of claim 21, further comprising at least one resilient member disposed adjacent to a portion of the housing.

24. The rotary damper of claim 23, wherein the at least one resilient member comprises an elastomer.

25. The rotary damper of claim 23, wherein the at least one resilient member tapers from the outer portion of the housing towards a center axis of the rotor assembly.

26. The rotary damper of claim 23, wherein the at least one resilient member comprises a disk shape.

27. The rotary damper of claim 21, further comprising first and second resilient members disposed adjacent to first and second portions of the housing.

28. The rotary damper of claim 27, wherein the first resilient member is disposed between an upper canister fixation member of the housing and an upper machine fixation member.

29. The rotary damper of claim 27, wherein the second resilient member is disposed between a lower canister fixation member of the housing and a lower machine fixation member.

\* \* \* \* \*